US012575982B2

(12) United States Patent
Giesa et al.

(10) Patent No.: US 12,575,982 B2
(45) Date of Patent: Mar. 17, 2026

(54) TRANSPORT OF PASSENGERS WITH REDUCED MOBILITY

(71) Applicants:Airbus Operations GmbH, Hamburg (DE); Airbus SAS, Blagnac (FR)

(72) Inventors: Hans-Gerhard Giesa, Hamburg (DE); Dirk Meiranke, Hamburg (DE); Jakob Payk, Hamburg (DE); Paul Martinez, Blagnac (FR)

(73) Assignees: AIRBUS OPERATIONS GMBH, Hamburg (DE); AIRBUS SAS, Blagnac (FR)

( * ) Notice: Subject to any disclaimer, the term of this patent is extended or adjusted under 35 U.S.C. 154(b) by 0 days.

(21) Appl. No.: 19/021,670

(22) Filed: Jan. 15, 2025

(65) Prior Publication Data

US 2025/0228719 A1     Jul. 17, 2025

(30) Foreign Application Priority Data

Jan. 17, 2024     (EP) ..................................... 24290001

(51) Int. Cl.
*A61G 3/08*          (2006.01)
*B64D 11/06*          (2006.01)
(52) U.S. Cl.
CPC ........ *A61G 3/0808* (2013.01); *B64D 11/0696* (2013.01)
(58) Field of Classification Search
CPC . B64D 11/06; B64D 11/0639; B64D 11/0696; B64D 2011/009; A61G 3/0808
See application file for complete search history.

(56) References Cited

U.S. PATENT DOCUMENTS

| | | | |
|---|---|---|---|
| 4,115,884 A | 9/1978 | Keogh | |
| 5,026,225 A | 6/1991 | McIntyre | |
| 11,691,740 B2 | 7/2023 | Elliott et al. | |
| 2009/0016836 A1* | 1/2009 | Girardin | A61G 3/0808 |
| | | | 410/7 |

(Continued)

FOREIGN PATENT DOCUMENTS

| | | | |
|---|---|---|---|
| AU | 2016371233 A1 | 5/2018 | |
| AU | 2020102223 A4 * | 11/2020 | B64D 11/00 |

(Continued)

OTHER PUBLICATIONS

European Search Report for corresponding European Patent Application No. 24290001.7 dated Sep. 2, 2024.

*Primary Examiner* — Timothy D Collins
*Assistant Examiner* — Justin Michael Heston
(74) *Attorney, Agent, or Firm* — Greer, Burns & Crain, Ltd.

(57) ABSTRACT

A restraining device for restraining a wheelchair in a cabin area on board of an aircraft. The device comprises a beam-like base structure being elongate in a beam extension direction, at least two floor connectors attached to the base structure and at least one restraining connector attached to the base structure. The floor connectors are spaced apart from each other in the beam extension direction. The floor connectors are configured to temporarily mount the base structure to a seat rail floor support in an aircraft cabin. The restraining connectors are configured to be temporarily connected to a structural part of the wheelchair to hold the wheelchair in place with a passenger seated therein.

20 Claims, 11 Drawing Sheets

(56) References Cited

U.S. PATENT DOCUMENTS

| 2014/0151503 | A1 | | 6/2014 | De La Fuente Carnero et al. |
| 2017/0231844 | A1 | * | 8/2017 | Gale .................... A61G 3/0808 |
| | | | | 410/7 |
| 2020/0039626 | A1 | * | 2/2020 | Johnson ............... B64D 11/062 |
| 2020/0297559 | A1 | | 9/2020 | Barclay et al. |
| 2023/0240918 | A1 | | 8/2023 | Giesa et al. |

FOREIGN PATENT DOCUMENTS

| DE | 102020111829 | A1 | 11/2021 |
| EP | 2745824 | A2 | 6/2014 |
| EP | 3608227 | A1 | 2/2020 |
| WO | 2016157081 | A1 | 10/2016 |

* cited by examiner

TRANSPORT OF PASSENGERS WITH REDUCED MOBILITY

CROSS-REFERENCES TO RELATED APPLICATIONS

This application claims the benefit of European Patent Application Number 24290001.7 filed on Jan. 17, 2024, the entire disclosure of which is incorporated herein by way of reference.

FIELD OF THE INVENTION

The present invention relates to transport of passengers with reduced mobility. The invention relates in particular to a restraining device for restraining a wheelchair in a cabin area on board of an aircraft, to a fastening arrangement for restraining a passenger's personal wheelchair on board of an aircraft, to a transport system for a passenger in a personal wheelchair on board of an aircraft and to a method for restraining a wheelchair in a cabin area on board of a commercial aircraft. The invention also relates to a restraining device for restraining a transport arrangement in a cabin area on board of an aircraft, such as patient transport stretcher or an animal transport device.

BACKGROUND OF THE INVENTION

Air travel with wheelchairs can be challenging for passengers with reduced mobility, but also for airports and airlines. So-called on-board wheelchairs have been developed to facilitate handling onboard within the cabin area, since these on-board wheelchairs are usually smaller in their dimensions compared to wheelchairs normally used by individuals with reduced mobility. These normal wheelchairs are also referred to as personal wheelchairs. When using on-board wheelchairs, the personal wheelchairs are stowed in the cargo area to maximize cabin space. However, this requires extra attention when handling the wheelchair within the cargo space. To improve comfort of passengers with reduced mobility, solutions have been proposed based on using the passenger's wheelchair also onboard the aircraft. As an example, DE 10 2020 111 829 A1 provides a platform as a base unit with fastening means to restrain the passenger's wheelchair on the base unit. In a variant, the base unit is provided in the form of two plate-shaped surface sections attachable to floor rails in an aircraft. As further examples, EP 3608227 A1 and WO 2016/157081 A1 also provide platforms for the passenger's wheelchair. U.S. Pat. No. 5,026,225 proposes a direct fixation of the wheelchair to track sections in the vehicle floor. US 2017/231844 A1 provides a frame-like arrangement with support members secured to seat mounting tracks. However, it has been shown that fixing a wheelchair can be cumbersome and may interfere with operation efficiency.

SUMMARY OF THE INVENTION

There may thus be a need for improvements in handling wheelchair transport onboard of an aircraft.

An object of the present invention is solved by one or more embodiments described herein. It should be noted that the following described aspects of the invention apply also for the restraining device for restraining a wheelchair in a cabin area on board of an aircraft, for the fastening arrangement for restraining a passenger's personal wheelchair on board of an aircraft, for the transport system for a passenger in a personal wheelchair on board of an aircraft and to for the method for restraining a wheelchair in a cabin area on board of a commercial aircraft.

According to the present invention, a restraining device for restraining a wheelchair in a cabin area on board of an aircraft is provided. The device comprises a beam-like base structure being elongate in a beam extension direction, at least two floor connectors attached to the base structure and at least one restraining connector attached to the base structure. The floor connectors are spaced apart from each other in the beam extension direction; the floor connectors are configured to temporarily mount the base structure to a seat rail floor support in an aircraft cabin. The restraining connectors are configured to be temporarily connected to a structural part of the wheelchair to hold the wheelchair in place with a passenger seated therein.

As an advantage, fixation of a wheelchair is provided by a rather small device that allows stowage on board when not in use. The device is easy to install and to de-install. The secure fixation of the wheelchair is also provided in a facilitated manner.

According to an example, the base-structure is adaptable in its length in the extension direction to accommodate to different seat rail distances.

This provides the advantage of suitability for different aircrafts and different locations onboard an aircraft.

According to an example, for an adaptable length, the base structure comprises at least two parts that are telescopably connected. A locking mechanism is provided that releasably locks the telescopable parts with respect to each other.

According to an example, the at least one restraining connector comprises i) a restraining element adjustable in its length, and ii) a connector element attached to a distal end of the restraining element for connection with the structural part of the wheelchair.

According to an example, two restraining connectors are provided. At least one of the restraining connectors is adjustable in its position along the length of the base structure in the beam extension direction.

In an option, the base structure comprises an attachment rail segment for the at least one restraining connector and the at least one restraining connector comprises a releasable attachment mechanism for mounting the restraining connector to the attachment rail segment.

According to an example, the floor connectors are provided as protrusions extending from a lower side of the base structure. The protrusions comprise a laterally projecting head portion for a form-fitting engagement with a seat rail arranged in a cabin floor.

According to an example, for a pairwise connected stowage during non-use, the lower side of the base structure comprises a number of recesses, wherein the number is matching with a number of the protrusions. At least one of the recesses comprise a latching mechanism to temporarily engage with a protrusion on a lower side of a corresponding base structure of a second device for restraining a passenger's personal wheelchair on board of an aircraft.

The pairwise stowage allows a space-saving accommodation but also ensures that all necessary parts needed for a wheelchair fixation are arranged together.

According to an example, the beam-like base structure comprises two wheel receiving portions for resting a pair of wheels of the wheelchair on the beam-like base structure.

According to the present invention, also a fastening arrangement for restraining a passenger's personal wheelchair on board of an aircraft is provided. The arrangement comprises at least one pair of restrainers comprising two restraining devices according to one of the preceding examples.

According to an example, at least one load distribution structure is provided to be arranged between the two restraining devices. The at least one load distribution structure comprises wheel resting portions configured for placing the wheels of the wheelchair upon the resting portions when the wheelchair is in the restrained position.

According to the present invention, also a transport system for a passenger in a personal wheelchair on board of an aircraft is provided. The system comprises a fastening arrangement according to one of the examples above and a stowage pallet. The stowage pallet comprises a flat base and is configured to be compatible with a standard cargo loading system used in commercial aircrafts. The stowage pallet comprises at least two fixation rails on its upper side for temporarily mounting at least one seat arrangement with at least one passenger seat for stowage of the at least one seat arrangement in a cargo area of the aircraft during transport of the passenger in the personal wheelchair in a cabin area of the aircraft.

According to an example, the stowage pallet is configured to be used as a cargo pallet during non-use as stowage pallet for stowing a seat arrangement.

In an option, a distance of the fixation rails on the stowage pallet is adjustable to match with different seat leg arrangements.

In a further option, in addition or alternatively, an adaptor grid as is provided as an add-on attachable temporary to a regular standard cargo pallet for the seat transportation.

According to the present invention, also a method for restraining a wheelchair in a cabin area on board of a commercial aircraft is provided. The method comprises the following steps:

provision a first restraining device according to one of the examples above;

temporarily mounting the base structure of the first restraining device to a seat rail floor support in an aircraft cabin by the floor connectors;

placing the wheelchair in position with a passenger seated therein;

temporarily connecting the at least one restraining connector of the first restraining device to a structural part of the wheelchair;

providing a second restraining device according to one of the examples above;

temporarily mounting the base structure of the second restraining device to the seat rail floor support in the aircraft cabin by the floor connectors; and temporarily connecting the at least one restraining connector of the second restraining device to a structural part of the wheelchair to hold the wheelchair in place.

According to an example of the method, before providing the first restraining device, it is provided the steps of:

releasing a floor mount of at least one seat arrangement comprising at least one passenger seat;

moving the at least one seat arrangement outside the cabin area;

attaching the at least one seat arrangement to two fixation rails on an upper side of a stowage pallet that comprises a flat base and that is compatible with a standard cargo loading system used in the commercial aircraft; and moving the stowage pallet into a cargo area of the commercial aircraft with the mounted at least one seat arrangement.

According to the present invention, also a restraining device for restraining a transport arrangement in a cabin area on board of an aircraft is provided. The device comprises a beam-like base structure being elongate in a beam extension direction, at least two floor connectors attached to the base structure and at least one restraining connector attached to the base structure. The floor connectors are spaced apart from each other in the beam extension direction. The floor connectors are configured to temporarily mount the base structure to a seat rail floor support in an aircraft cabin. The restraining connectors are configured to be temporarily connected to a structural part of the transport arrangement to hold the transport arrangement in place.

According to an example, the transport arrangement is a patient transport stretcher.

According to an example, the patient transport stretcher comprises a subject support and a foldable base structure with wheels. The beam-like base structure comprises wheel receiving portions for placing and locking of the wheels of the foldable base structure.

According to an example, the transport arrangement is an animal transport device with an accommodation receptacle. The animal transport container comprises a base structure for supporting the accommodation receptacle. The beam-like base structure comprises receiving portions for placing and locking of the base structure of the animal transport container.

According to an example, for an adaptable length, the base structure comprises at least two parts that are telescopably connected. A locking mechanism is provided that releasably locks the telescopable parts with respect to each other.

As an advantage, fixation of a patient transport device or animal transport device is provided by a rather small device that allows stowage on board when not in use. The device is easy to install and to de-install. The secure fixation of the patient transport device or animal transport device is also provided in a facilitated manner.

According to an aspect, the conversion of a normal passenger seat to an area for wheelchair accommodation, patient transport or animal transport can take place at regular turn-around times at airports with no or only minimum impact on the total time on ground. The proposed solutions result in time savings for both airlines and passengers.

The restraining device for a passenger's wheelchairs helps as a further solution among various activities and initiatives pushing to make traveling on personal wheelchairs feasible. Even though the safe accommodation of a passenger wheelchair inside the cabin requires the space of one or even several passenger seats, the restraining device provides a flexible solution with no or only very limited permanent seat count loss. Only during use, the seat count of the cabin space is affected.

Thus, improvement in terms of accessibility for passengers with reduced mobility is provided, supporting both inclusivity and efficiency of operating an aircraft. The user comfort is thus increased as well as the passenger's safety. The solution provides improved adaptability and is easy to handle while still being compact and lightweight in design and also enabling the use of innovative materials in a sustainable way.

The restraining devices allow a temporary change of the aircraft cabin during turn-around for transport of personal wheelchairs. By this, maximum flexibility is offered to the operators of a commercial aircraft. The restraining devices are designed for quick and easy installation without any limitation on safety. The restraining devices are lightweight and compact suitable for transport and stowage onboard when not in use. Furthermore, adjustability for different aircraft types with different seat track pitches is given and various wheelchair types can be accommodated. Further, the restraining devices are also certifiable according to the anticipated standards regarding crash safety.

The restraining device for restraining a transport arrangement provides further options for use of passenger aircrafts, such as for patient transport by providing an option to temporarily fix a stretcher, or for animal transport by providing an option to temporarily fixing different kinds of receptacle accommodating the respective animal in an appropriate manner.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the following drawings:

FIG. 14 schematically shows an example of a transport system comprising an example of the fastening arrangement and a stowage pallet;

FIG. 15 shows basic steps of an example of a method for restraining a wheelchair in a cabin area on board of a commercial aircraft;

DETAILED DESCRIPTION OF THE PREFERRED EMBODIMENTS

Figures 1A, 1B:
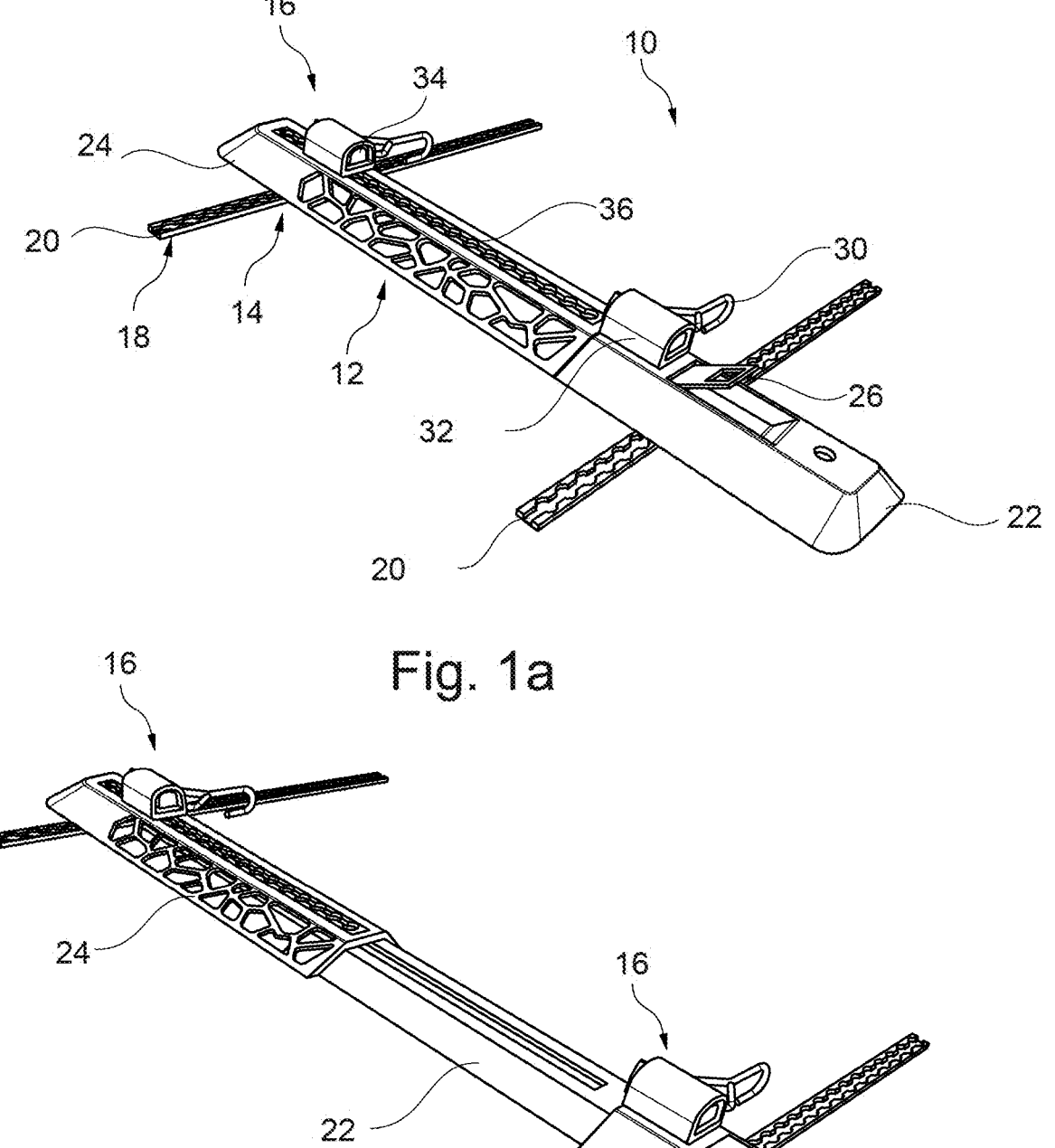
FIG. 1a shows a perspective view of an example of a restraining device for restraining a wheelchair in a cabin area on board of an aircraft in relation with seat rails of a cabin floor with a beam-like base structure of the restraining device in a lengthwise retracted state.
FIG. 1b shows a perspective view of the example of a restraining device for restraining a wheelchair in a cabin area on board of an aircraft in relation with seat rails of a cabin floor of FIG. 1a with the beam-like base structure in an expanded state.

Certain embodiments will now be described in greater details with reference to the accompanying drawings. In the following description, like drawing reference numerals are used for like elements, even in different drawings. The matters defined in the description, such as detailed construction and elements, are provided to assist in a comprehensive understanding of the exemplary embodiments. Also, well-known functions or constructions are not described in detail since they would obscure the embodiments with unnecessary detail. Moreover, expressions such as "at least one of", when preceding a list of elements, modify the entire list of elements and do not modify the individual elements of the list.

FIG. 1a shows a beam-like base structure of the restraining device in a lengthwise retracted state. FIG. 1b shows the beam-like base structure in an expanded state.

FIG. 1a and FIG. 1b show a perspective view of an example of a restraining device 10 for restraining a wheelchair in a cabin area on board of an aircraft in relation with seat rails of a cabin floor. The restraining device 10 comprises a beam-like base structure 12 being elongate in a beam extension direction. The restraining device 10 also comprises at least two floor connectors 14 (not visible in FIG. 1a) attached to the base structure 12. The restraining device 10 further comprises at least one restraining connector 16 attached to the base structure 12. The floor connectors 14 are spaced apart from each other in the beam extension direction. The floor connectors 14 are configured to temporarily mount the base structure 12 to a seat rail floor support 18 in an aircraft cabin. As an option, the seat rail floor support 18 is shown as a pair of seat rails 20. The restraining connectors 16 are configured to be temporarily connected to a structural part of the wheelchair to hold the wheelchair in place with a passenger seated therein.

The term "wheelchair" relates to any kind of wheelchair used by passengers with reduced mobility. The wheelchair can be manually moved by the passenger or by an aiding person. The wheelchair can also be moved by a motor. For example, the wheelchair is a passenger's personal wheelchair.

The term "restraining" relates to securely holding the wheelchair in place during operation of the aircraft, i.e. during taxiing, starting phase, cruise phase and landing phase.

The term "base structure" relates to a body structure that provides the support for attaching the further parts like the floor connectors and the restraining connectors and that is also suitable for transferring the respective loads.

The term "floor connectors" relates to components provided for connecting the restraining device to the floor.

The term "restraining connector" relates to components provided for providing the restraining forces.

The term "beam extension direction" relates to the general longitudinal direction of the base structure. In an example of a mounted state, the beam extension direction runs transverse to the longitudinal direction of the aircraft.

The term "temporarily" relates to holding or mounting for a designated time span, e.g. during the passenger's stay onboard the aircraft.

The seat rails can also be referred to as seat tracks.

The restraining connectors are configured to hold the wheelchair in place during an operation of the aircraft.

In an example, the floor connectors allow to position the beam-like base structure over the rails and lock it in position by simply pushing on the device. In an option, by lifting the base structure, the base structure can be released. However, when being subject to tensioning forces of the restraining elements, the base structures are securely fixed to the floor rails.

In another example, the locking mechanism allows to position the beam-like base structure over the rails and lock it in position by simply pushing on the device. In an option, a lever is provided that can be lifted to release the locking.

The base-structure is provided as a bar-structure, leaving the further floor area between two bars unobstructed. This facilitates the correct placement of the wheelchair.

In an option, four restrainers are provided, i.e. four restraining connectors. In one example, two restraining devices are provided with two restraining connectors each.

In a further example, one restraining device is provided with two restraining connectors, and two additional separate restrainers are provided.

In an example, a wheelchair is fixed during aircraft movement by two forward restraining connectors and two aft restraining connectors. In an option, the restraining connectors with their connecting components are arranged in a symmetrical arrangement. In an example, the four restraining connectors provide four tension elements or pressure rods for holding the wheelchair in place. In an example, the restraining connectors are arranged in an inclined form providing crossing holding directions when holding the wheelchair.

In one option, the four restraining connectors provide an X-type arrangement of tension elements or pressure rods for holding the wheelchair in place.

As an option, FIG. 1a and FIG. 1b show that the base-structure 12 is adaptable in its length in the extension direction to accommodate to different seat rail distances.

The term "adaptable" relates to the base-structure being adjustable in its length.

The term "adaptable in its length" relates to being able to change the length of the base-structure.

The term "accommodate" relates to being able to be adjusted to different seat rail distances.

The base-structure is adjustable in its length to accommodate to different lateral pitches of seat rails.

The expandability of the base structures provides adjustability to all aircraft cabins with different seat track pitches.

The adjustable positions of the restraining connectors provide adjustability to different wheelchair dimensions by rearrangement of the belt roll-up fitting.

As an option, FIG. 1a and FIG. 1b show that, for an adaptable length, the base structure 12 comprises at least two parts, e.g. a first part 22 and a second part 24 that are telescopably connected. A locking mechanism 26 is provided that releasably locks the telescopable parts with respect to each other.

The term "telescopably" relates to two different parts, of which one can at least partly be inserted into the other part or pulled out of the other part to change the overall length.

The term "locking mechanism" relates to a component that can block and release the capability of being telescopable.

In an example, the base structures of the restraining devices are provided as bionic beams with material distribution adapted to the actual flow of forces with the base structures. As an example, recycled aluminum is used in an additive manufacturing. Paired with a bionic structure, this allows a sustainable and lightweight design.

As an option, FIG. 1a shows that the at least one restraining connector 16 comprises a restraining element 28 adjustable in its length (see also FIG. 7), and a connector element 30 attached to a distal end of the restraining element 28 for connection with the structural part of the wheelchair.

In an example, the restraining element 28 is wound up inside a housing 32. A release knob 34 for the restraining element 28 is provided as an option.

The term "restraining element" relates to a component suitable to transmit a restraining, i.e. holding force. The restraining elements connects the wheelchair with the base structure.

The term "connector element" relates to a component suitable to be releasably attached to the wheelchair.

In an example, the restraining element is a flexible linear element to transmit tensional forces. For example, the restraining element is a cord, rope, wire or belt.

In another example, the restraining element is a rigid linear element to transmit pressure forces. For example, the restraining element is a pressure rod.

As an option, FIG. 1a shows that two restraining connectors 16 are provided. At least one of the restraining connectors 16 is adjustable in its position along the length of the base structure 12 in the beam extension direction.

As an option, the base structure comprises an attachment rail segment 36 for the at least one restraining connector 16 and the at least one restraining connector 16 comprises a releasable attachment mechanism (not shown) for mounting the restraining connector to the attachment rail segment.

The term "attachment rail segment" relates to a sort of rail portion that allows an attachment of the restraining connector at a number of different positions to provide an adjustable width.

In an example, the attachment mechanism is manually releasable. In another example, the attachment mechanism is releasable with a tool having a designated interface.

Figure 2:
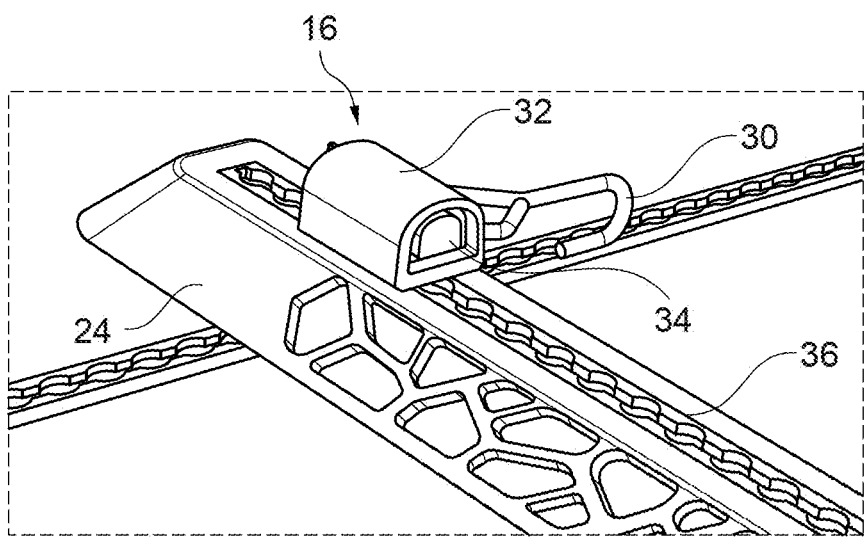
FIG. 2 shows an enlarged view of one end portion of the restraining device of FIG. 1a with one of two restraining connectors.

FIG. 2 shows an enlarged view of one end portion of the restraining device 10 of FIG. 1a with one of two restraining connectors 16.

Figure 3:
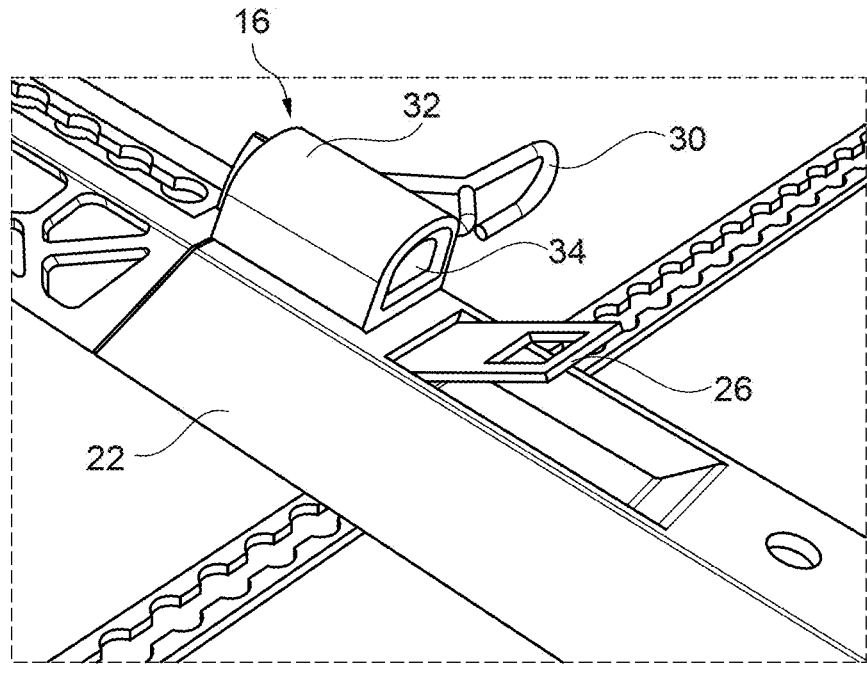
FIG. 3 shows an enlarged view of the other end portion of the restraining device of FIG. 1a with the one of the two restraining connectors.

FIG. 3 shows an enlarged view of the other end portion of the restraining device 10 of FIG. 1a with the other one of the two restraining connectors 16.

Figures 6, 7:
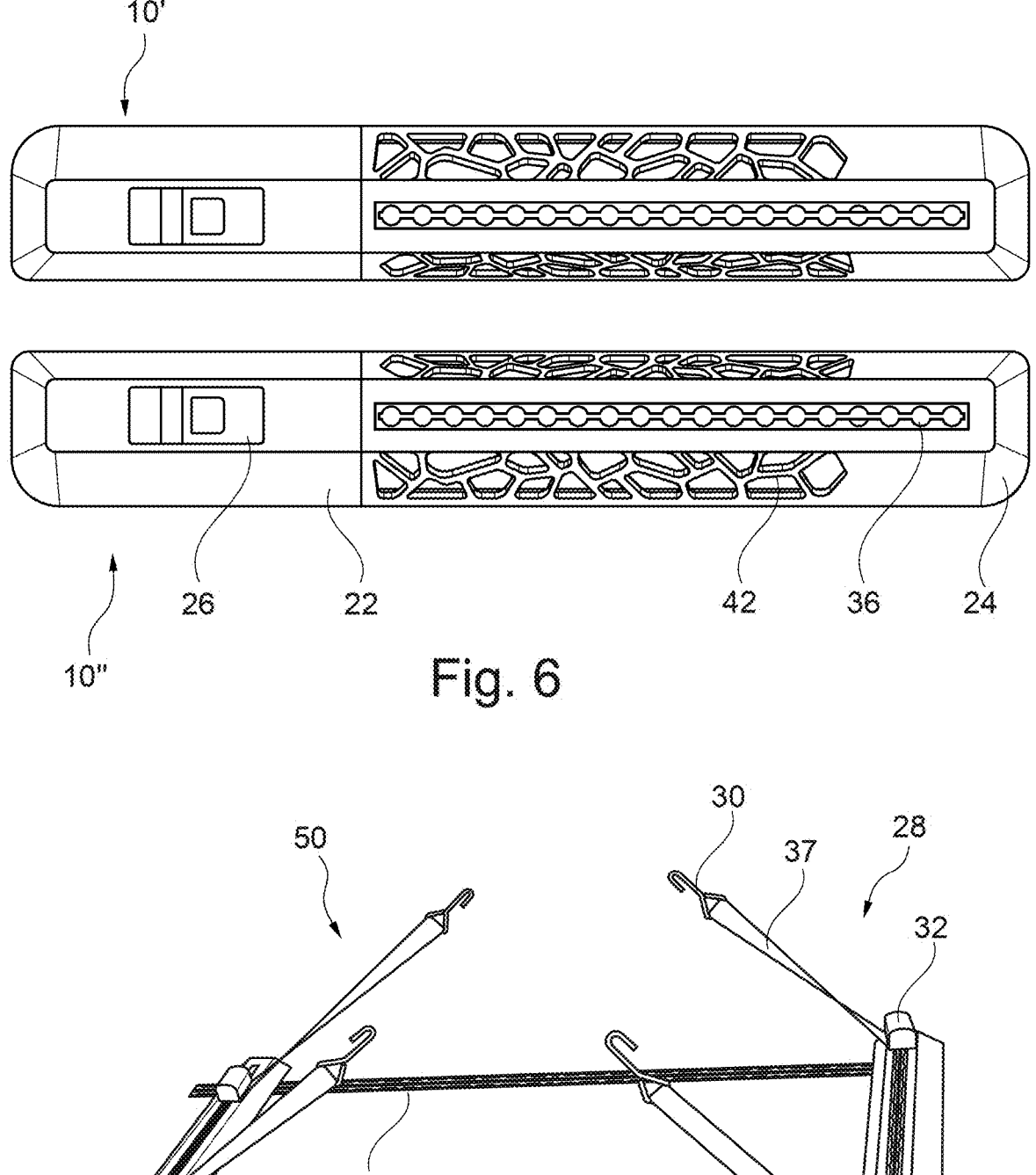
FIG. 6 shows a top view of a pair of two restraining devices without restraining connectors.
FIG. 7 shows a perspective view of a fastening arrangement comprising a pair of two restraining devices mounted to seat rails, the restraining connectors are shown with partly extracted restraining elements spanning for holding a wheelchair in place.

As an option, see FIG. 7, the restraining element 28 is a belt-like element 37 releasably wound-up on a reel (e.g. inside the housing) equipped with a blocking mechanism.

The term "belt-like element" relates to a longitudinal and bendable component.

The belt-like element can be a band or tape with a flat cross-section.

The term "reel" relates to a sort of drum upon which the belt-like element can be rolled-up.

In an example, the blocking mechanism is a blockable seatbelt safety drum.

The belt-like element is rolled-up on the reel in order to be at least partly unrolled from the reel when attached to the wheelchair.

In an example, the connector element is a hook. In another example, the connector element is a coupling for engagement with a coupling counterpart attached to the wheelchair.

Figure 4:
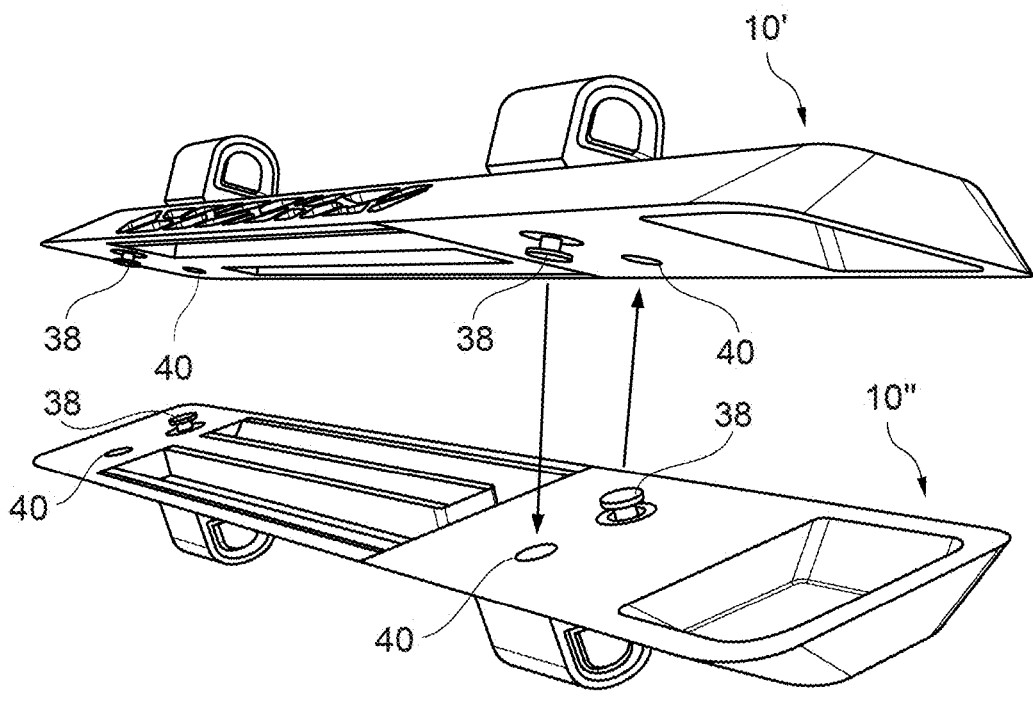
FIG. 4 shows two restraining devices that can be attached to each other for stowage purposes.

FIG. 4 shows two restraining devices 10', 10" that can be attached to each other for stowage purposes.

As an option, FIG. 4 shows that the floor connectors are provided as protrusions 38 extending from a lower side of the base structure 12. The protrusions 38 comprise a laterally projecting head portion for a form-fitting engagement with a seat rail arranged in a cabin floor.

The term "protrusions" relates to parts extending from the surface to reach into matching holes or grooves provided by a floor mounted seat rail.

The term "lower side" relates to the side facing towards the floor surface when the restraining device is in its mounted state.

The term "laterally projecting head portion" relates to portions extending sidewards to allow a form-fitting engagement for holding the restraining device in place.

In an example, the floor connectors comprise a lever for operating the floor connectors between a locked and unlocked state.

As an option, FIG. 4 shows that, for a pairwise connected stowage during non-use, the lower side of the base structure 12 comprises a number of recesses 40, wherein the number is matching with a number of the protrusions 38. At least one of the recesses 40 comprise a latching mechanism (not shown) to temporarily engage with a protrusion 38 on a lower side of a corresponding base structure 12 of a second device for restraining a passenger's personal wheelchair on board of an aircraft.

The term "recess" relates to a groove or whole capable of receiving the respective protrusion of the other restraining device.

In an example, the recesses and the protrusions are offset to a virtual longitudinal center line. For example, the recesses and the protrusions are offset by the same amount.

In another example, the recesses and the protrusions are longitudinally arranged along a virtual center line. For example, on one end of the base structure, a first protrusion is provided with a first distance to the one end, and a first recess is provided with a second distance to the one end. On the other end of the base structure, a second recess is provided with the first distance to the other end, and a second protrusion is provided with the second distance to the other end.

This results in a very compact arrangement for stowage purposes.

In an example, the beam-like base structure is compactable for stowage purposes to a length of approximately 80.0 cm and a width of approximately 12.5 cm.

Figure 5:
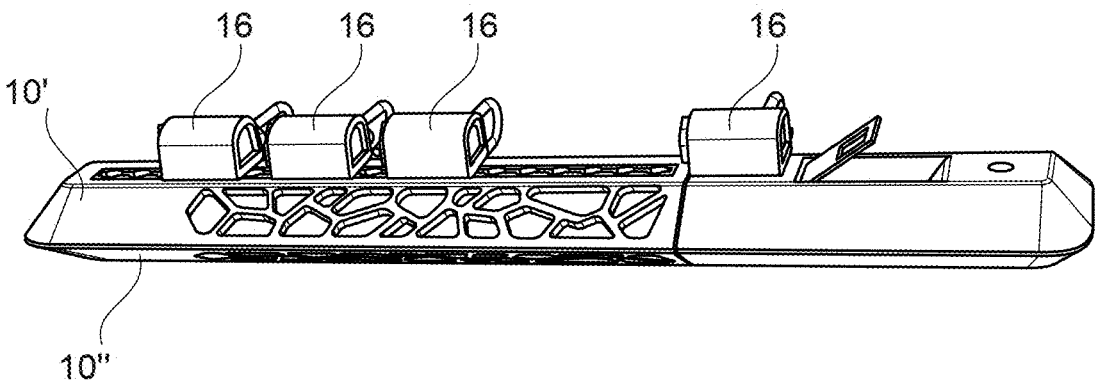
FIG. 5 shows the two restraining devices of FIG. 4 temporarily attached to each other for stowage, the two restraining connectors of the lower restraining device are fixed to the upper restraining device for better handling purposes.

FIG. 5 shows the two restraining devices 10' and 10" of FIG. 4 temporarily attached to each other. The two restraining connectors 16 of the lower restraining device 10" are fixed to the upper restraining device 10' for better handling purposes.

FIG. 6 shows a top view of a pair of two restraining devices 10', 10" without the restraining connectors.

To reduce weight of the restraining device 10', 10", a skeleton structure 42 is used for a part of the base structure 12.

FIG. 7 shows a perspective view of a fastening arrangement 50 for restraining a passenger's personal wheelchair on board of an aircraft. The arrangement comprises a pair of two restraining devices 10 mounted to seat rails 20. The restraining connectors 16 are shown with partly extracted restraining elements 28 spanning for holding a wheelchair in place.

In the sense of efficient use of space, lightweight and easy to handle, the two base structures required for one wheelchair can be joined and locked them together and store them in the overhead bins. In an option, also all restraining equipment can be locked such that all parts stay together during stowage.

In an option, not shown in detail, the beam-like base structure comprises two wheel receiving portions for resting a pair of wheels of the wheelchair on the beam-like base structure.

The term "wheel receiving portions" relates to parts on which wheels of a wheelchair can rest. The wheel receiving portions can be provided as flat portions or also as little recesses.

In an example, a first restraining device is provided with wheel receiving portions.

In a first variation, the rear wheels of a wheelchair can be provided resting on the beam-like base structure to provide weight distribution along the length of the beam-like base structure.

In a second variation, the front wheels of the wheelchair can be provided resting on the beam-like base structure.

In another example, a first and a second restraining device are provided with wheel receiving portions such that both the front and the rear wheels of the wheelchair can rest on the respective beam-like base structures.

In an option, at least one load distribution structure is provided to be arranged between the two restraining devices 10. The at least one load distribution structure comprises wheel resting portions configured for placing the wheels of the wheelchair upon when the wheelchair is in the restrained position.

The term "load distribution structure" relates to a structural part that receives a more or less punctual load stemming from the wheel of the wheelchair and that transmits the load over a larger area thus providing a load distribution avoiding high load impact peaks on floor panels.

The term "wheel resting portions" relates to parts on which wheels of a wheelchair can be arranged, i.e. parked.

In an example, the load distribution structure is provided as a plate-like load distribution panel. In a first option, the plate-like load distribution panel is provided to receive a pair of wheels of the wheelchair, for example the front wheels or the rear wheels. In a second option, the plate-like load distribution panel is provided to receive two pairs of wheels of the wheelchair, for example the front wheels and the rear wheels.

In another example, the load distribution structure is provided as a beam-like load distribution bar. In an option, one beam-like load distribution bar is provided to receive a pair of wheels of the wheelchair, for example the front wheels or the rear wheels. In another option, two beam-like load distribution bars are provided to receive a pair of wheels of the wheelchair each, for example the front wheels on one of the two bars and the rear wheels on the other one of the two bars.

Figure 10:
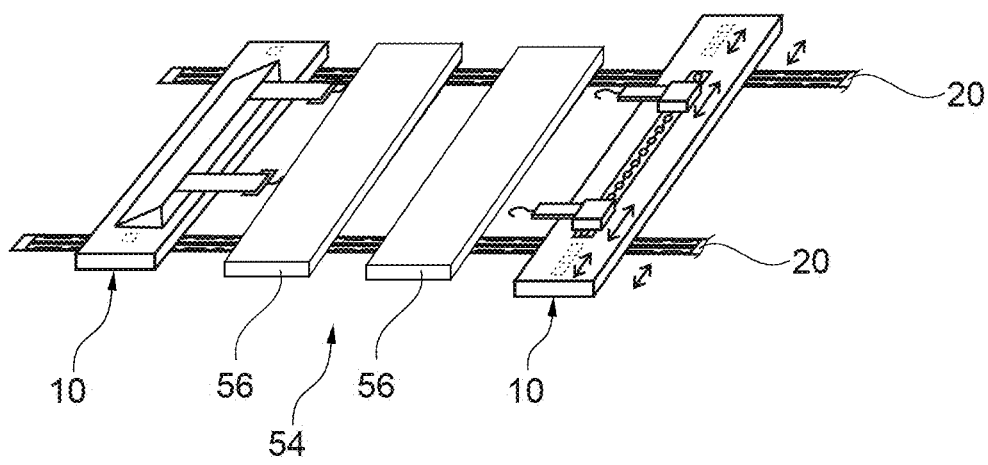
FIG. 10 shows an example of a fastening arrangement with a load distribution structure between the two restraining devices.

FIG. 10 shows an example of the fastening arrangement 50 with a load distribution structure 54 between the two restraining devices 10. The distribution structure 54 is provided in form of two bars 56 for supporting the wheels of the wheelchair.

In an option (not shown), a plate-like load distribution panel is combined with a beam-like load distribution bar.

In another option, a plate-like load distribution panel/beam-like load distribution bar is combined with wheel receiving portions on the beam-like base structure.

In a further option, a beam-like load distribution bar is combined with wheel receiving portions on the beam-like base structure.

In a still further option, four beam-like base structures are provided, two for restraining the wheelchair and two for load distribution. For example, all four base structures are provided with the floor connectors, but only two of them equipped with the restraining connectors. In another example, all four base structures are equipped with the restraining connectors.

Figures 14, 15:
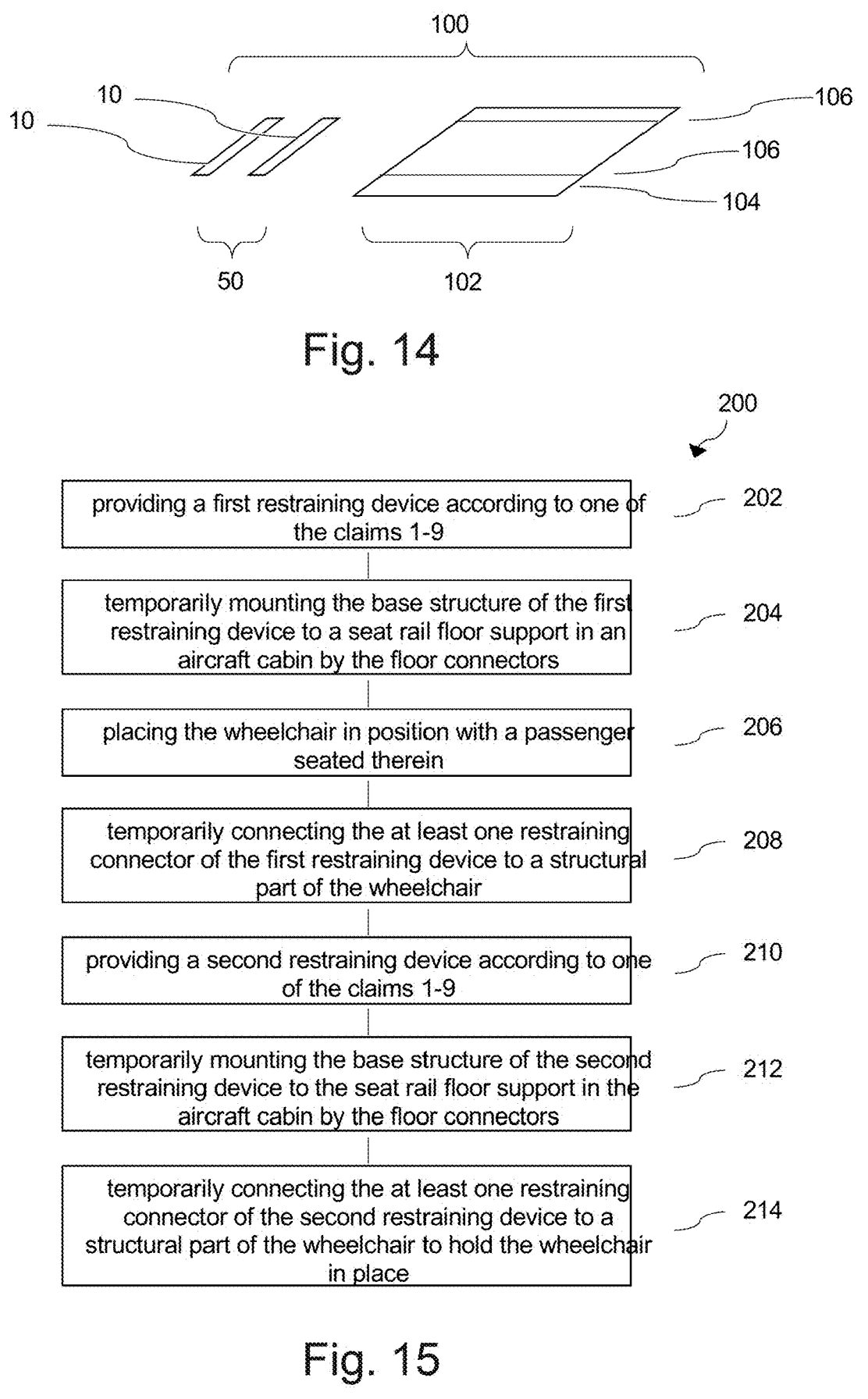

Also, a transport system 100 for a passenger in a personal wheelchair on board of an aircraft is provided (see also FIG. 14). The transport system 100 comprises an example of the fastening arrangement 50 according to the examples above and a stowage pallet 102. The stowage pallet 102 comprises a flat base 104 and is configured to be compatible with a standard cargo loading system used in commercial aircrafts. The stowage pallet 102 comprises at least two fixation rails 106 on its upper side for temporarily mounting at least one seat arrangement with at least one passenger seat for stowage of the at least one seat arrangement in a cargo area of the aircraft during transport of the passenger in the personal wheelchair in a cabin area of the aircraft.

Figure 8:
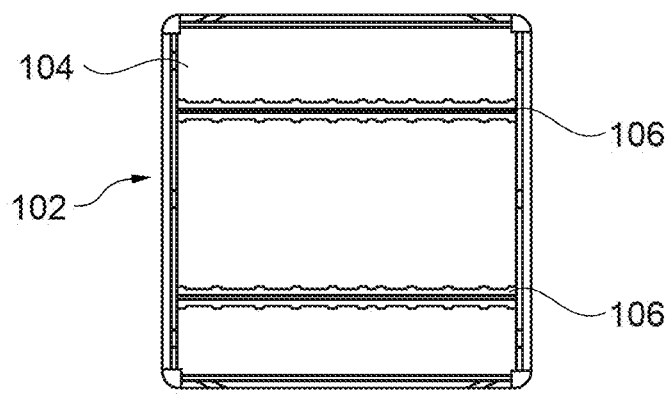
FIG. 8 shows a top view of an example of a stowage pallet configured for the stowage of temporarily demounted cabin seat arrangements, the stowage pallet has integrated fixation rails.

FIG. 8 shows a top view of an example of the stowage pallet 102 configured for the stowage of temporarily demounted cabin seat arrangements. The stowage pallet 102 has integrated fixation rails 106.

Figure 9:
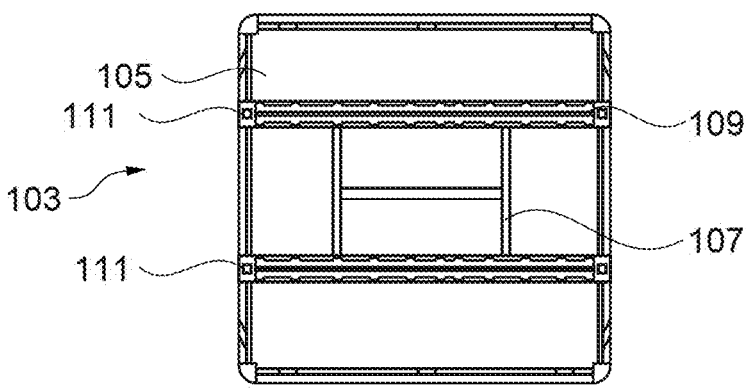
FIG. 9 shows a top view of another example of a stowage pallet configured for the stowage of temporarily demounted cabin seat arrangements, the stowage pallet has an adaptable fixation rail grid.

FIG. 9 shows a top view of another example of a cargo pallet 103 configured for the stowage of temporarily demounted cabin seat arrangements. The cargo pallet 103 comprises a flat cargo support base 105 and has an adaptable fixation rail grid 107 with fixation rails 109. As an example, attachment points 111 of the rail grid 107 to the cargo support base 105 are indicated for a temporary installation of the rail grid to the cargo pallet 103.

In a further option, not shown, a stowage pallet is provided with a permanently installed adaptable fixation rail grid.

The term "stowage pallet" relates to a pallet configured to be arranged in a stowage bay, i.e. cargo area of an aircraft. The stowage pallet is a pallet-like flat structural component suitable for stowage handling, such as being moved along a cargo floor in a cargo area by power drive units of a cargo loading system and being restrained by cargo holding equipment such as cargo latches.

The term "seat rails" relates to rail-like mounting devices used for attaching seats to a floor support in a cabin area.

The term "fixation rails" also relates to rail-like mounting devices used for attaching seats to the stowage pallet. The fixation rails on the stowage pallet provide a similar, e.g. the same geometric interface as seat rails.

In an example, the at least two fixation rails are inserted in the upper side of the flat base of the stowage pallet to be flush with an even surface of the upper surface.

As an example, the stowage pallet 102 has a size of approximately 1.5 m by 1.5 m.

In an example, the stowage pallet 102 is configured to be used as a cargo pallet during non-use as stowage pallet for stowing a seat arrangement. As an option, a distance of the fixation rails on the stowage pallet 102 is adjustable to match with different seat leg arrangements (see e.g. FIG. 8). As another option (see e.g. FIG. 9), an adaptor grid is provided as an add-on attachable temporary to a regular standard cargo pallet for the seat transportation.

This allows to have one er even more, like to or three pallets on board, but instead of stowing them away when not in use, the pallets can be used for cargo purposes when not used for seat row stowage.

Figure 11A:
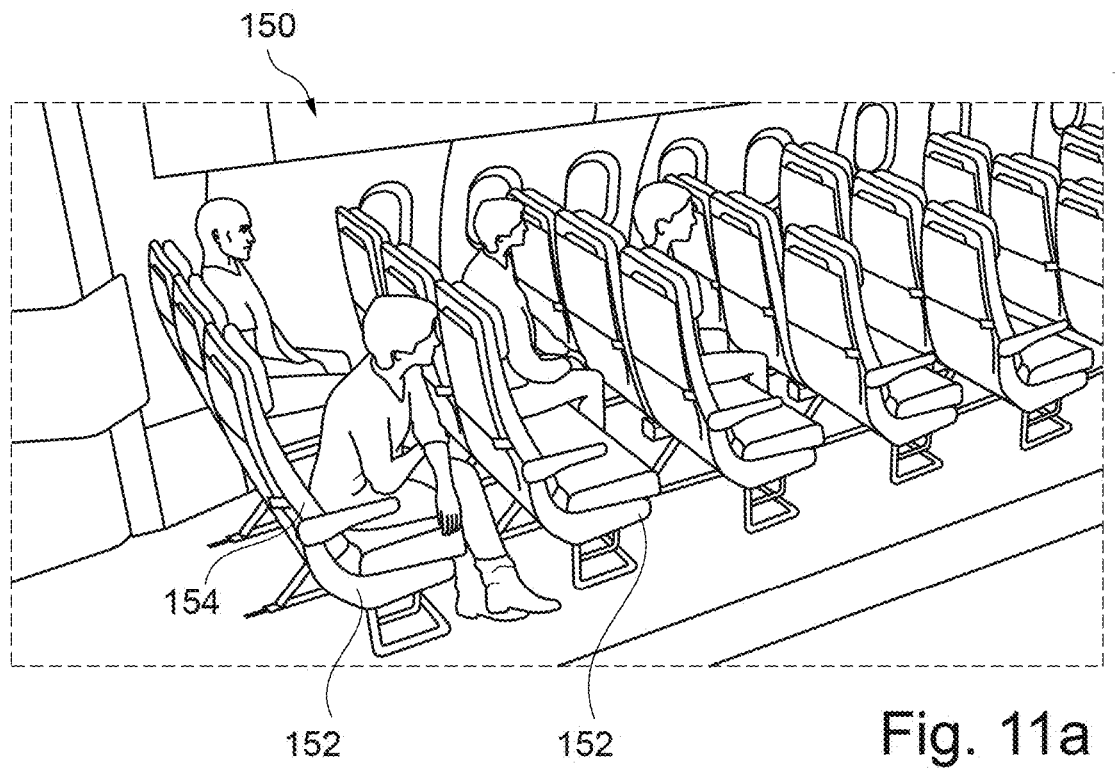
FIG. 11a shows a rear section of a cabin area with a plurality of rows of passenger seat arrangements.
Figure 11B:
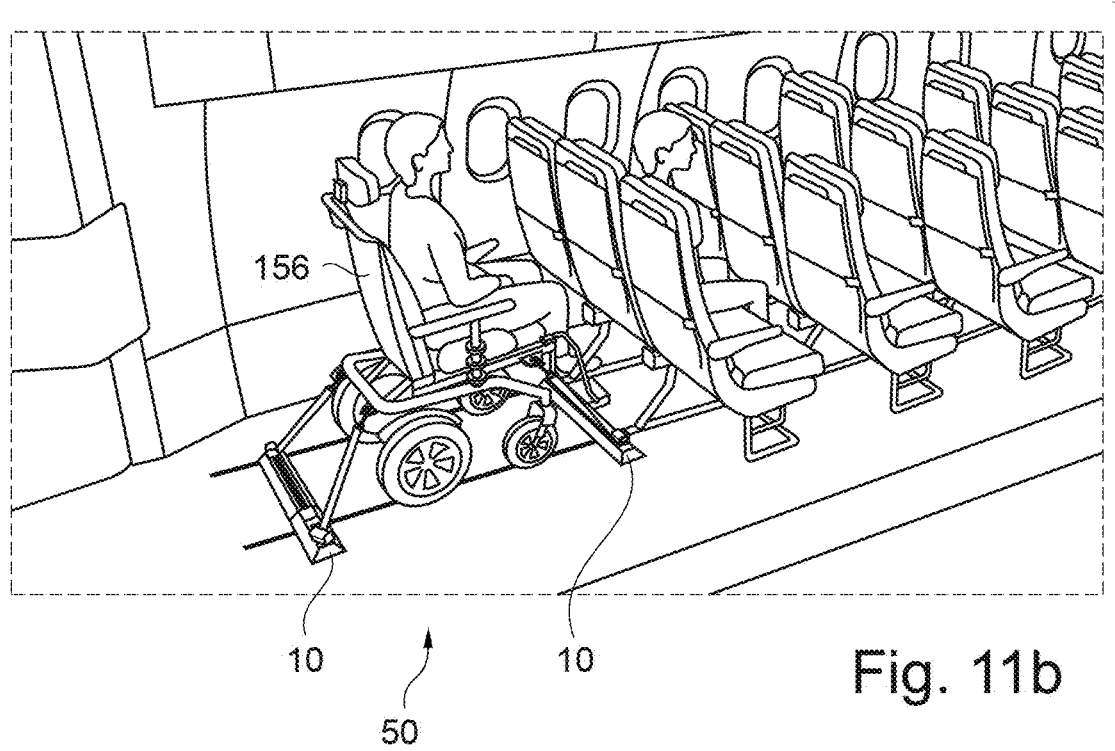
FIG. 11b shows the cabin area with two rows of passenger seat arrangements demounted and a wheelchair is secured with the fastening arrangement of FIG. 7.

FIG. 11a shows a rear section of a cabin area 150 with a plurality of rows 152 of passenger seat arrangements 154. FIG. 11b shows the cabin area with two rows of passenger seat arrangements demounted. Instead, a wheelchair 156 is secured with the fastening arrangement 50 of FIG. 7.

FIGS. 12a-h show a sequence of operational steps for providing secure travel of a person with reduced mobility using a wheelchair.

Figures 12A, 12B, 12C, 12D:
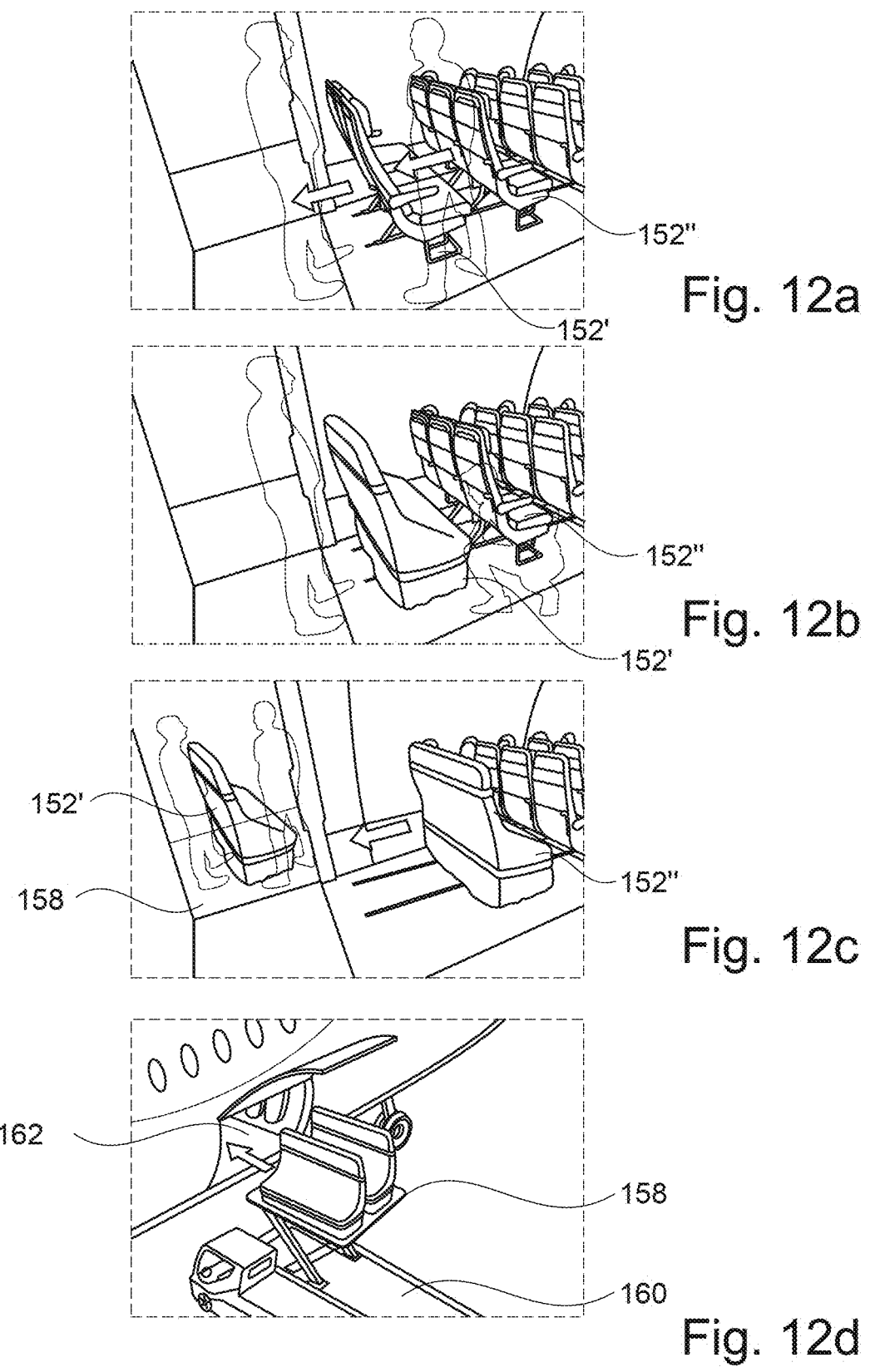
FIG. 12a shows a first step in a sequence of operational steps for providing secure travel of a person with reduced mobility using a wheelchair two seat rows to be demounted.
FIG. 12b shows a second step with a first one of the seat rows being optionally protected by a cover.
FIG. 12c shows a third step with the first seat row being transported through an aircraft door to the exterior of the aircraft, the second seat row is protected by a cover.
FIG. 12d shows a fourth step with both seat rows when being transported into the cargo area of the aircraft.

FIG. 12a shows two seat rows 152', 152'' to be demounted.

FIG. 12b shows a first seat row 152' of the seat rows being optionally protected by a cover.

FIG. 12c shows the first seat row 152' being transported through an aircraft door to the exterior of the aircraft. The second seat row 152'' is protected by a further cover and about to be demounted.

FIG. 12d shows both seat rows 152', 152'' when transported into the cargo area of the aircraft. For example, the seat rows are arranged on a platform 158 of a lifting equipment 160, also referred to as loader, which is indicated to provide the transfer from the aircraft door to a cargo opening 162 of the aircraft. In another example, not shown, the seat rows are arranged on an example of stowage pallet 102 mentioned above, which stowage pallet 102 is lifted and handled by a loader. The stowage pallet 102 is handled in the cargo area with a cargo loading system, CLS.

Figures 12E, 12F, 12G, 12H:
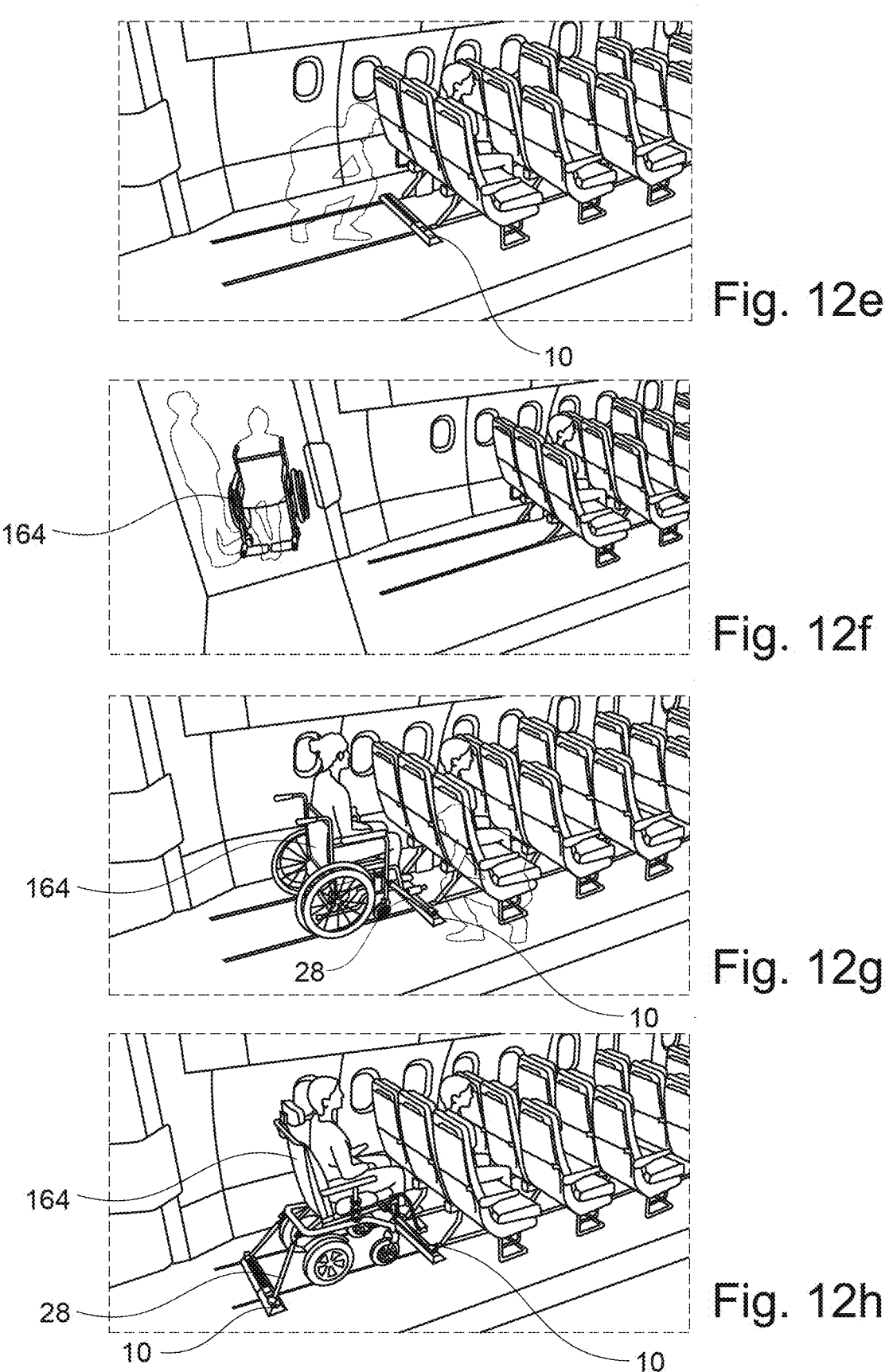
FIG. 12e shows a fifth step with a staff member fixing a first restraining device to the seat rails.
FIG. 12f shows a sixth step with a person in a wheelchair entering the aircraft door.
FIG. 12g shows a seventh step with the wheelchair positioned in relation to the first restraining device, the staff member is attaching a first set of restraining elements to the wheelchair.
FIG. 12h shows an eighth step with the staff member fixing a second restraining device to the seat rails and attaching a first set of restraining elements to the wheelchair.

FIG. 12e shows a staff member fixing a first example of the restraining device 10 to the seat rails.

FIG. 12f shows a person in a wheelchair 164 entering the aircraft door.

FIG. 12g shows the wheelchair 164 positioned in relation to the first restraining device 10. The staff member is attaching a first set of restraining elements 28 of the first restraining device 10 to the wheelchair 164.

FIG. 12h shows the staff member fixing a second example of the restraining device 10 to the seat rails and attaching a first set of restraining elements 28 of the first restraining device 10 to the wheelchair 164.

Figure 13A:
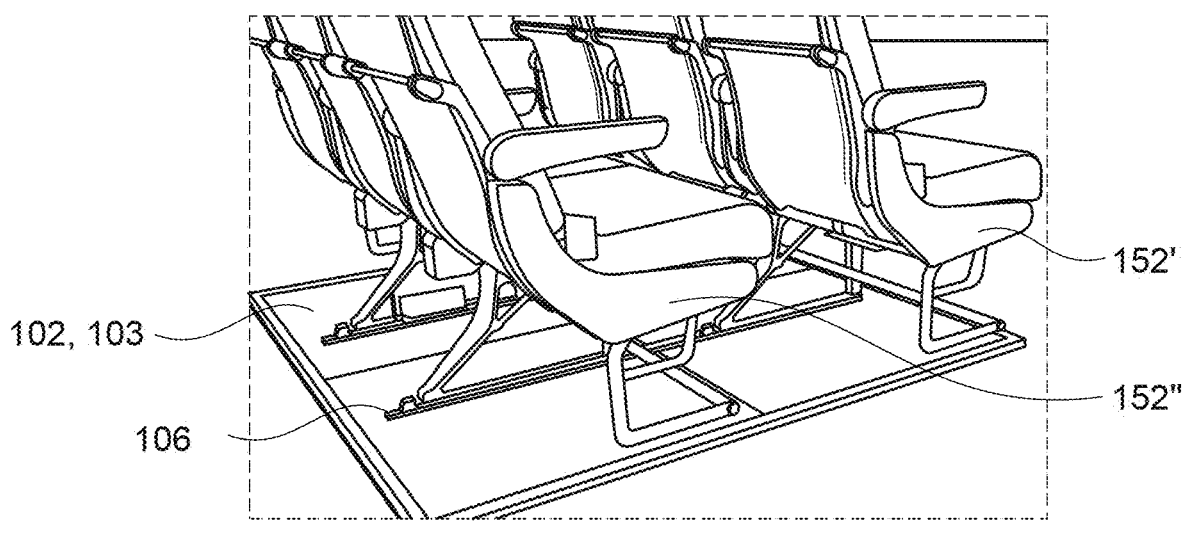
FIG. 13a shows a first step of a sequence of operational steps for storing the demounted seat rows in the cargo area with two demounted seat rows attached to a stowage pallet.
Figure 13B:
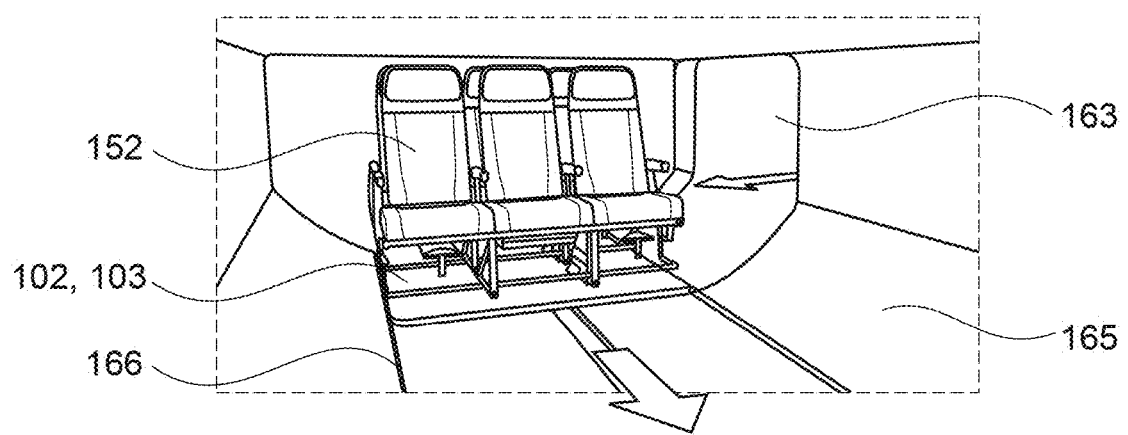
FIG. 13b shows a second step with the stowage pallet being pushed through a cargo door of the aircraft into the cargo area.
Figure 13C:
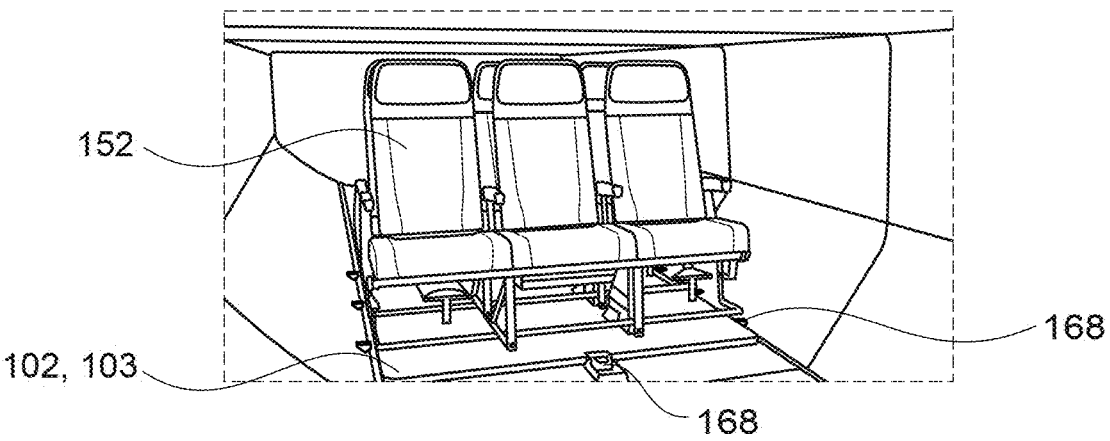
FIG. 13c shows a third step with the stowage pallet being pushed along the cargo area with a cargo loading system (CLS) and fixed by the cargo loading system.

FIGS. 13a-c show a sequence of operational steps for storing the demounted seat rows in the cargo area.

FIG. 13a shows the two demounted seat rows 152', 152" attached to an example of the stowage pallet 102. The fixation rails on the stowage pallet 102 are indicated.

FIG. 13b shows the stowage pallet 102 being pushed through a cargo door 163, i.e. through the cargo opening 162 of the aircraft into a cargo area 165. Moving rails 166 can be provided within the cargo area 165.

FIG. 13c shows the stowage pallet 102 being pushed along the cargo area 165 via a cargo loading system and restrained by cargo latches 168 of the cargo loading system.

In another example, individual seat rows are stowed without the use of cargo holds and are individually strapped for restraining purposes, e.g. when no CLS is present.

FIG. 14 schematically shows an example of the transport system 100 comprising an example of the fastening arrangement and a stowage pallet.

FIG. 15 shows basic steps of an example of a method 200 for restraining a wheelchair in a cabin area on board of a commercial aircraft. The method 200 comprises the following steps:

In a first step 202, a first restraining device according to one of the examples above is provided.

In a second step 204, the base structure of the first restraining device is temporarily mounted to a seat rail floor support in an aircraft cabin by the floor connectors.

In a third step 206, the wheelchair is placed in position with a passenger seated therein.

In a fourth step 208, the at least one restraining connector of the first restraining device is temporarily connected to a structural part of the wheelchair.

In a fifth step 210, a second restraining device is provided according to one of the examples above.

In a sixth step 212, the base structure of the second restraining device is temporarily mounted to the seat rail floor support in the aircraft cabin by the floor connectors.

In a seventh step 214, the at least one restraining connector of the second restraining device is temporarily connected to a structural part of the wheelchair to hold the wheelchair in place.

In an example, as part of installation, is also provided a step of adjusting the length to the prevailing seat track pitch and adjusting the connector to the wheelchair size.

In an option, seat arrangements are transported in the cargo hold in a loose manner and restrained by straps/lashings like oversized luggage.

In an example of the method, before providing the first restraining device, it is provided the steps of:

releasing a floor mount of at least one seat arrangement comprising at least one passenger seat;

moving the at least one seat arrangement outside the cabin area;

attaching the at least one seat arrangement to two fixation rails on an upper side of a stowage pallet that comprises a flat base and that is compatible with a standard cargo loading system used in the commercial aircraft; and moving the stowage pallet into a cargo area of the commercial aircraft with the mounted at least one seat arrangement.

In an example, the seats are mounted to the stowage pallet outside the aircraft. For example, a support device holds the pallet in a respective height directly outside the fuselage exit which is closest to the area designated for the wheelchair placement. A preferred place for the wheelchair is the rear right door of the aircraft.

In an option, instead of the designated stowage pallet, a kit of fixation rails is provided that can be attached to any available standard cargo pallet.

Figure 16:
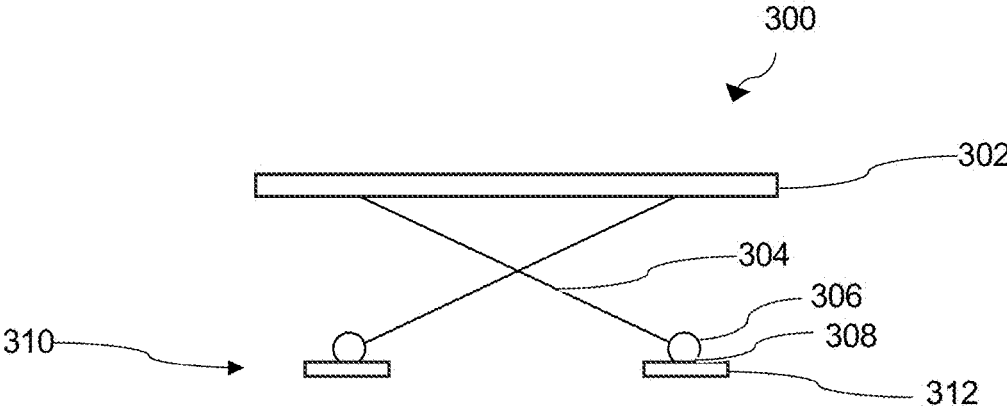
FIG. 16 shows an example of a basic steps of an example of a restraining device for restraining a transport arrangement in a cabin area on board of an aircraft, the transport arrangement is provided as a patient transport stretcher; and, FIG. 17 shows another example of a basic steps of an example of a restraining device for restraining a transport arrangement in a cabin area on board of an aircraft, the transport arrangement is provided as an animal transport device.
Figure 17:
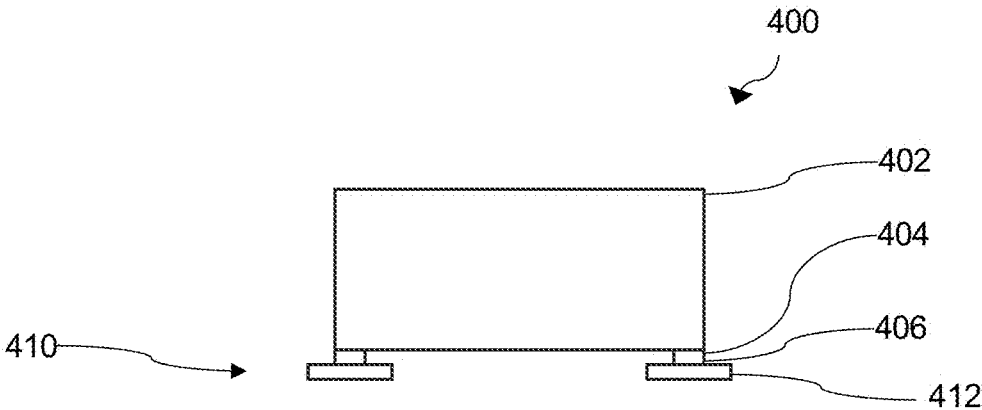

FIG. 16 and FIG. 17 show two examples for restraining device 310, 410 for restraining a transport arrangement in a cabin area on board of an aircraft. The device comprises a beam-like base structure 312, 412 being elongate in a beam extension direction. Further details are provided in a similar manner as described above in the context of the restraining device 10 for restraining a wheelchair in a cabin area on board of an aircraft.

As an example, at least two floor connectors attached to the base structure 312, 412; and at least one restraining connector attached to the base structure 312, 412. The floor connectors are spaced apart from each other in the beam extension direction. The floor connectors are configured to temporarily mount the base structure 312, 412 to a seat rail floor support in an aircraft cabin. The restraining connectors are configured to be temporarily connected to a structural part of the transport arrangement to hold the transport arrangement in place.

According to an example, the base-structure 312, 412 is adaptable in its length in the extension direction to accommodate to different seat rail distances.

FIG. 16 shows the restraining device 310 in a context where the transport arrangement is a patient transport stretcher 300. As an option, the patient transport stretcher 300 comprises a subject support 302 and a foldable base structure 304 with wheels 306. The beam-like base structure 312 comprises wheel receiving portions 308 for placing and locking of the wheels 306 of the foldable base structure 304.

In an example, an appropriate patient transport stretcher is provided according to the needs of the patient to be transported to ensure a safe and proper transport. As an example, different transport stretchers are provided to be able to choose a suitable stretcher.

FIG. 17 shows the restraining device 410 in a context where the transport arrangement is an animal transport device 400 with an appropriate accommodation receptacle 402. As an option, the animal transport device 400 comprises a base structure 404 for supporting the accommodation receptacle 402. The beam-like base structure 412 comprises receiving portions 406 for placing and locking of the base structure 404 of the animal transport device 400.

The appropriate accommodation receptacle 402 is provided according to the animal(s) to be transported to ensure a safe and proper transport. As an example, different accommodation receptacles are provided to be able to choose the right one.

As an option, provided for the various examples of the restraining device 310, 410, for an adaptable length, the base structure comprises at least two parts that are telescopably connected (not shown in detail); and a locking mechanism is provided that releasably locks the telescopable parts with respect to each other (also not shown in detail).

According to an example, the at least one restraining connector comprises: i) a restraining element adjustable in its length; and ii) a connector element attached to a distal end of the restraining element for connection with the structural part of the transport arrangement.

According to an example of the restraining device for restraining a transport arrangement, the restraining element is a belt-like element releasably wound-up on a reel equipped with a blocking mechanism.

According to an example of the restraining device 310, 410 for restraining a transport arrangement, two restraining connectors are provided. At least one of the restraining connectors is adjustable in its position along the length of the base structure in the beam extension direction. The base structure comprises an attachment rail segment for the at least one restraining connector and the at least one restraining connector comprises a releasable attachment mechanism for mounting the restraining connector to the attachment rail segment.

According to an example of the restraining device 310, 410 for restraining a transport arrangement, the floor connectors are provided as protrusions extending from a lower side of the base structure. The protrusions comprise a laterally projecting head portion for a form-fitting engagement with a seat rail arranged in a cabin floor. For a pairwise connected stowage during non-use, the lower side of the base structure comprises a number of recesses, wherein the number is matching with a number of the protrusions. At least one of the recesses comprise a latching mechanism to temporarily engage with a protrusion on a lower side of a corresponding base structure of a second restraining device for restraining a transport arrangement on board of an aircraft.

According to an example of the restraining device 310, 410 for restraining a transport arrangement, the beam-like base structure comprises receiving portions for resting a base part of the transport arrangement on the beam-like base structure.

According to an example of the restraining device 310, 410 for restraining a transport arrangement, a fastening arrangement for restraining a transport arrangement on board of an aircraft is provided, the arrangement comprising at least one pair of restrainers comprising two restraining devices according to one of the preceding examples.

According to an example of the restraining device 310, 410 for restraining a transport arrangement, at least one load distribution structure is provided to be arranged between the two restraining devices. The at least one load distribution structure comprises load insertion portions configured for placing the base parts of the transport arrangement upon when the transport arrangement is in the restrained position.

As an option, also a transport system for a patient or for animals on board of an aircraft is provided. The system comprises a fastening arrangement according to the preceding example and a stowage pallet. The stowage pallet comprises a flat base and is configured to be compatible with a standard cargo loading system used in commercial aircrafts. The stowage pallet comprises at least two fixation rails on its upper side for temporarily mounting at least one seat arrangement with at least one passenger seat for stowage of the at least one seat arrangement in a cargo area of the aircraft during transport of the patient or the animal(s).

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A restraining device for restraining a wheelchair in a cabin area on board of an aircraft, the device comprising:
   a beam base structure being elongate in a beam extension direction;
   at least two floor connectors attached to the beam base structure; and
   at least one restraining connector attached to the beam base structure;
   wherein the at least two floor connectors are spaced apart from each other in the beam extension direction;
   wherein the at least two floor connectors are configured to temporarily mount the beam base structure to a seat rail floor support in an aircraft cabin;
   wherein the at least one restraining connector is configured to be temporarily connected to a structural part of the wheelchair to hold the wheelchair in place with a passenger seated therein,
   wherein, for a pairwise connected stowage during non-use, a lower side of the beam base structure comprises a number of recesses, wherein the number of recess matches with a number of protrusions, and wherein at least one of the recesses comprise a latching mechanism to temporarily engage with a protrusion on a lower side of a second beam base structure of a second restraining device for restraining a wheelchair on board of the aircraft.

2. The restraining device according to claim 1, wherein the beam base structure is configured to adapt a length in the extension direction to accommodate to different seat rail distances.

3. The restraining device according to claim 2, wherein, for an adaptable length, the beam base structure comprises at least two parts that are telescopably connected; and wherein a locking mechanism is provided that releasably locks the at least two parts that are telescopably connected with respect to each other.

4. The restraining device according to claim 1, wherein the at least one restraining connector comprises:

a restraining element configured to adjust in length; and a connector element attached to a distal end of the restraining element for connection with the structural part of the wheelchair.

5. The restraining device according to claim 4, wherein the restraining element comprises a belt releasably wound-up on a reel equipped with a blocking mechanism.

6. The restraining device according to claim 1, wherein two restraining connectors are provided;

wherein at least one of the two restraining connectors is configured to adjust a position along the length of the beam base structure in the beam extension direction; and wherein the beam base structure comprises an attachment rail segment for the at least one restraining connector and the at least one restraining connector comprises a releasable attachment mechanism for mounting the at least one restraining connector to the attachment rail segment.

7. The restraining device according to claim 1, wherein the at least two floor connectors are provided as protrusions extending from a lower side of the beam base structure; and wherein the protrusions comprise a laterally projecting head portion for a form-fitting engagement with a seat rail arranged in a cabin floor.

8. The restraining device according to claim 1, wherein the beam base structure comprises two wheel receiving portions for resting a pair of wheels of the wheelchair on the beam base structure.

9. A fastening arrangement for restraining a passenger's personal wheelchair on board of an aircraft, the fastening arrangement comprising:

at least one pair of restraining devices according to claim 1, each restraining device of the pair configured to be temporarily connected to a structural part of the wheelchair to hold the wheelchair in place with a passenger seated therein.

10. The fastening arrangement according to claim 9, wherein at least one load distribution structure is provided to be arranged between the two restraining devices of the at least one pair of restraining devices; and wherein the at least one load distribution structure comprises wheel resting portions configured for placing wheels of the wheelchair when the wheelchair is in a restrained position.

11. A transport system for a passenger in a personal wheelchair on board of an aircraft, the system comprising:

the fastening arrangement according to claim 10; and a stowage pallet;

wherein the stowage pallet comprises a flat base and is configured to be compatible with a standard cargo loading system used in commercial aircrafts;

wherein the stowage pallet comprises at least two fixation rails on its upper side for temporarily mounting at least one seat arrangement with at least one passenger seat for stowage of the at least one seat arrangement in a cargo area of the aircraft during transport of the passenger in the personal wheelchair in a cabin area of the aircraft.

12. The transport system according to claim 11, wherein the stowage pallet is configured to be used as a cargo pallet during non-use as stowage pallet for stowing a seat arrangement; and wherein a distance of the fixation rails on the stowage pallet is configured to adjust to match with different seat leg arrangements; or wherein an adaptor grid as is provided as an add-on attachable temporary to a regular standard cargo pallet for seat transportation; or both.

13. A method for restraining a wheelchair in a cabin area on board of a commercial aircraft, the method comprising the following steps:

providing two restraining devices according to claim 1 configured to be temporarily connected to a structural part of the wheelchair to hold the wheelchair in place;

temporarily mounting the beam base structure of a first restraining device to a seat rail floor support in an aircraft cabin by the at least two floor connectors of the first restraining device;

placing the wheelchair in position with a passenger seated therein;

temporarily connecting the at least one restraining connector of the first restraining device to a structural part of the wheelchair;

temporarily mounting the beam base structure of a second restraining device to a seat rail floor support in the aircraft cabin by the at least two floor connectors of the second restraining device; and temporarily connecting the at least one restraining connector of the second restraining device to a structural part of the wheelchair to hold the wheelchair in place.

14. The method according to claim 13, wherein, before providing the first restraining device, the method includes the steps of:

releasing a floor mount of at least one seat arrangement comprising at least one passenger seat;

moving the at least one seat arrangement outside the cabin area;

attaching the at least one seat arrangement to two fixation rails on an upper side of a stowage pallet that comprises a flat base and that is compatible with a standard cargo loading system used in the commercial aircraft; and moving the stowage pallet into a cargo area of the commercial aircraft with the mounted at least one seat arrangement.

15. A restraining device for restraining a transport arrangement in a cabin area on board of an aircraft, the restraining device comprising:

a beam base structure being elongate in a beam extension direction;

at least two floor connectors attached to the beam base structure; and at least one restraining connector attached to the beam base structure;

wherein the at least two floor connectors are spaced apart from each other in the beam extension direction;

wherein the at least two floor connectors are configured to temporarily mount the beam base structure to a seat rail floor support in an aircraft cabin; and wherein the at last one restraining connector is configured to be temporarily connected to a structural part of the transport arrangement to hold the transport arrangement in place, wherein, for a pairwise connected stowage during non-use, a lower side of the beam base structure comprises a number of recesses, wherein the number of recess matches with a number of protrusions, and wherein at least one of the recesses comprise a latching mechanism to temporarily engage with a protrusion on a lower side of a second beam base structure of a second restraining device for restraining the transport arrangement on board of the aircraft.

16. The restraining device according to claim 15, wherein, for an adaptable length, the beam base structure comprises at least two parts that are telescopably connected; and wherein a locking mechanism is provided that releasably locks the at least two parts that that are telescopably connected with respect to each other.

17. A restraining device for restraining in combination with a transport arrangement in a cabin area on board of an aircraft, the restraining device comprising:

a beam base structure being elongate in a beam extension direction;

at least two floor connectors attached to the beam base structure; and at least one restraining connector attached to the beam base structure;

wherein the at least two floor connectors are spaced apart from each other in the beam extension direction;

wherein the at least two floor connectors are configured to temporarily mount the beam base structure to a seat rail floor support in an aircraft cabin; and wherein the at last one restraining connector is configured to be temporarily connected to a structural part of the transport arrangement to hold the transport arrangement in place, wherein, for a pairwise connected stowage during non-use, a lower side of the beam base structure comprises a number of recesses, wherein the number of recess matches with a number of protrusions, and wherein at least one of the recesses comprise a latching mechanism to temporarily engage with a protrusion on a lower side of a second beam base structure of a second restraining device for restraining the transport arrangement on board of the aircraft.

18. The restraining device in combination with the transport arrangement according to claim 17, wherein the transport arrangement comprises a patient transport stretcher.

19. The restraining device in combination with the transport arrangement according to claim 18, wherein the patient transport stretcher comprises a subject support and a foldable base structure with wheels; and wherein the beam base structure comprises wheel receiving portions for placing and locking of the wheels of the foldable base structure.

20. The restraining device in combination with the transport arrangement according to claim 17, wherein the transport arrangement is an animal transport device with an accommodation receptacle;

wherein the animal transport device comprises a base structure for supporting the accommodation receptacle; and wherein the beam base structure comprises receiving portions for placing and locking of the base structure of the animal transport device.

* * * * *